(12) United States Patent
Zhou et al.

(10) Patent No.: US 12,108,332 B2
(45) Date of Patent: Oct. 1, 2024

(54) WAKE-UP SIGNAL WUS DETECTION METHOD AND APPARATUS

(71) Applicant: Huawei Technologies Co., Ltd., Shenzhen (CN)

(72) Inventors: Han Zhou, Shanghai (CN); Xiaolei Tie, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 17/579,368

(22) Filed: Jan. 19, 2022

(65) Prior Publication Data

US 2022/0141771 A1 May 5, 2022

Related U.S. Application Data

(63) Continuation of application No. PCT/CN2020/102843, filed on Jul. 17, 2020.

(30) Foreign Application Priority Data

Jul. 19, 2019 (CN) .......................... 201910656648.7

(51) Int. Cl.
*H04W 72/02* (2009.01)
*H04L 1/1829* (2023.01)
(Continued)

(52) U.S. Cl.
CPC ....... *H04W 52/0229* (2013.01); *H04W 76/28* (2018.02)

(58) Field of Classification Search
CPC ............. H04W 52/0229; H04W 76/28; H04W 52/0216; H04W 52/028; H04W 68/005;
(Continued)

(56) References Cited

U.S. PATENT DOCUMENTS

2013/0107775 A1* 5/2013 Cho ................... H04W 52/0235 370/311
2019/0254110 A1* 8/2019 He ......................... H04L 5/0048
(Continued)

FOREIGN PATENT DOCUMENTS

WO 2018169649 A1 9/2018
WO 2018202693 A1 11/2018
(Continued)

OTHER PUBLICATIONS

"UE-group wake-up signal for NB-IoT," 3GPP TSG RAN WG1 Meeting #97, Reno, USA, R1-1907192, Total 5 pages, 3rd Generation Partnership Project, Valbonne, France (May 13-17, 2019).
(Continued)

*Primary Examiner* — Inder P Mehra
(74) *Attorney, Agent, or Firm* — Leydig, Voit & Mayer, Ltd.

(57) ABSTRACT

Embodiments of this application relate to a wake-up signal (WUS) detection method and apparatus, to reduce signaling overheads of a network side device. The WUS detection method is as follows: a terminal device detects a terminal device-specific field in a detected WUS. If the terminal device detects the terminal device-specific field in the WUS, and detects that the WUS includes wake-up information for the terminal device, the terminal device determines, by using location information of the terminal device-specific field as a first index, a first physical uplink control channel (PUCCH) resource corresponding to the first index, and sends a first PUCCH, where the first PUCCH includes a first message used to feed back that the wake-up information for the terminal device is received.

18 Claims, 6 Drawing Sheets

(51) Int. Cl.
  *H04L 5/00* (2006.01)
  *H04W 52/02* (2009.01)
  *H04W 68/00* (2009.01)
  *H04W 72/21* (2023.01)
  *H04W 72/23* (2023.01)
  *H04W 76/28* (2018.01)

(58) Field of Classification Search
  CPC . H04W 52/0258; H04W 72/21; H04W 72/23; H04L 5/0053; H04L 1/1861; Y02D 30/70
  USPC .......................................................... 370/311
  See application file for complete search history.

(56) References Cited

U.S. PATENT DOCUMENTS

2021/0195524 A1* 6/2021 Ahn ...................... H04W 52/02
2021/0259044 A1* 8/2021 Islam ................ H04W 52/0229

FOREIGN PATENT DOCUMENTS

WO    2019033112 A1    2/2019
WO    2019059674 A1    3/2019
WO    2020029245 A1    2/2020

OTHER PUBLICATIONS

"Discussion on UE power saving schemes with adaption to UE traffic," 3GPP TSG RAN WG1 #96, Athens, Greece, R1-1903344, Total 14 pages, 3rd Generation Partnership Project, Valbonne, France (Feb. 25-Mar. 1, 2019).
"PDCCH-based power saving channel design," 3GPP TSG-RAN WG1 #97, Reno, USA, R1-1907294, Total 16 pages, 3rd Generation Partnership Project, Valbonne, France (May 13-17, 2019).
"Consideration on UE-group wake-up signal for Rel-16 NB-IoT," 3GPP TSG RAN WG1 Meeting #97, Reno, USA, R1-1907207, Total 3 pages, 3rd Generation Partnership Project, Valbonne, France (May 13-17, 2019).

* cited by examiner

Group-based WUS
Group-based wake-up signal

Group-based WUS
Group-based wake-up signal

WAKE-UP SIGNAL WUS DETECTION METHOD AND APPARATUS

CROSS-REFERENCE TO RELATED APPLICATIONS

This application is a continuation of International Application No. PCT/CN2020/102843, filed on Jul. 17, 2020, which claims priority to Chinese Patent Application No. 201910656648.7, filed on Jul. 19, 2019. The disclosures of the aforementioned applications are hereby incorporated by reference in their entireties.

TECHNICAL FIELD

Embodiments of the present invention relate to the field of wireless communications technologies, and in particular, to a wake-up signal WUS detection method and apparatus.

BACKGROUND

A network side device may send a physical downlink control channel (PDCCH) wake-up signal (WUS) to a plurality of user equipment (UEs) by using a group-based WUS. The group-based WUS carries wake-up information used to wake up the UE, and further carries information used to indicate a physical uplink control channel (PUCCH) resource used when each of the UEs feeds back information. The UE may feed back, to the network side device by using the information used to indicate the PUCCH resource used when the UE feeds back information, a message indicating whether the wake-up information is received.

The information used to indicate the PUCCH resource used when the UE feeds back information generally needs to occupy 4 to 6 bits. It is assumed that one group-based WUS indicates five UEs in total, and information that is used to indicate PUCCH resources used when the five UEs feed back information and that is in the group-based WUS needs to occupy 25 bits. A sum of the 25 bits and a quantity of bits of the wake-up information used to wake up the UE may exceed a quantity of bits that can be carried by the group-based WUS, or affect receiving performance of the WUS.

Therefore, a common method is to reduce a quantity of UEs indicated in each group-based WUS, and correspondingly reduce the information that is used to indicate the PUCCH resource used when the UE feeds back information and that is carried in the group-based WUS. However, in a case that a total quantity of UEs that need to be indicated remains unchanged, more group-based WUSs need to be sent to indicate all of the UEs. As a result, signaling overheads of the network side device are excessively high.

SUMMARY

Embodiments of this application provide a WUS detection method and apparatus. A PUCCH resource is not indicated in a WUS delivered by a network side device, so that signaling overheads of the network side device are reduced.

According to a first aspect, a WUS detection method is provided. A network side device sends a WUS to a terminal device, where the WUS includes a terminal device-specific field. The terminal device detects the terminal device-specific field in the detected WUS. If the terminal device detects the terminal device-specific field in the WUS, and detects wake-up information for the terminal device in the WUS, the terminal device determines a first PUCCH resource corresponding to the terminal device from preconfigured PUCCH resources, and sends a first PUCCH, where the first PUCCH includes a first message used to feed back that the wake-up information for the terminal device is received. The network side device receives the first PUCCH, and determines, based on the first message that is used to feed back that the wake-up information for the terminal device is received and that is included in the first PUCCH, that the terminal device receives the wake-up information. The WUS may be a UE-specific PDCCH WUS, or may be a group-based WUS. The WUS may include a PUCCH sending time offset, and may further include time-frequency resource switching indication information. The time-frequency resource switching indication information may include BWP switching indication information.

In the foregoing solution, the PUCCH resource used when information is fed back is preconfigured in the terminal device, and the network side device does not indicate, in the WUS sent to the terminal device, the PUCCH resource used when the terminal device feeds back information, so that a quantity of bits occupied by the PUCCH resource in the WUS can be reduced. Therefore, one WUS may carry wake-up information for more terminal devices, to indicate more terminal devices to wake up. When a quantity of the indicated terminal devices remains unchanged, signaling overheads of the WUS of the network-side device can be reduced.

In a possible implementation, before sending the WUS to the terminal device, the network side device may send a second message to the terminal device, and the terminal device receives the second message, where the second message is used to preconfigure the PUCCH resource. The PUCCH resource preconfigured in the second message may include only the first PUCCH resource used when the terminal device feeds back information, or may include first PUCCH resources used when a plurality of terminal devices feed back information, where the plurality of terminal devices include the terminal device. The second message may be RRC signaling or reuse other existing signaling. Alternatively, the second message may be a predefined and newly added signaling or the like.

In this implementation, the network side device preconfigures the PUCCH resource for the terminal device. After the terminal device is configured with the PUCCH resource, the network side device sends the WUS to the terminal device, and the PUCCH resource used when the terminal device feeds back information is not indicated in the sent WUS. Therefore, signaling overheads of the PUCCH resource in the WUS can be reduced.

In a possible implementation, the second message sent by the network side device to the terminal device is specifically used to configure an uplink BWP of the terminal device, and configure the first PUCCH resource for each uplink BWP.

In this implementation, the network side device may further preconfigure the uplink BWP and a PUCCH resource in the uplink BWP for the terminal device, and the terminal device may switch to the uplink BWP to send uplink control information.

In a possible implementation, if the WUS includes a WIF, the terminal device determines identification information of the terminal device, and determines a location of the terminal device-specific field in the WUS based on the identification information and the WIF. The terminal device determines the first PUCCH resource corresponding to location information of the terminal device-specific field. The identification information of the terminal device may include one or more of an identifier of the terminal device, a terminal device ID, an RNTI of the terminal device, and the like.

For example, the terminal device may perform calculation on identification information of a second terminal device and a WIF, for example, perform addition, subtraction, multiplication, and division (where a result of the division operation can be rounded down or rounded up), a modulo operation, and the like, and determine location information of a second terminal device-specific field in the WUS based on a calculation result. The terminal device may determine, by using the location information of the terminal device-specific field as a first index, the first PUCCH resource corresponding to the first index from the preconfigured PUCCH resources, where the second terminal device may represent a to-be-woken-up terminal device.

In this implementation, the network side device and the terminal device may determine the location of the terminal device-specific field in the WUS based on the identification information of the terminal device and the WIF, and the terminal device indicated in the WUS may be several non-fixed terminal devices. Instead, the terminal device may be flexibly indicated to wake up in different terminal device-specific field based on the WIF.

In a possible implementation, if the WUS does not include a WIF, the terminal device determines identification information of the terminal device, determines a location of the terminal device-specific field in the WUS based on the identification information, and determines the first PUCCH resource corresponding to location information of the terminal device-specific field.

The terminal device may determine, by using the location information of the terminal device-specific field as a first index, the first PUCCH resource corresponding to the first index from the preconfigured PUCCH resources.

In this implementation, the network side device and the terminal device may determine the location of the terminal device-specific field in the WUS based on the identification information of the terminal device, and therefore determine the first PUCCH resource corresponding to the location information of the terminal device-specific field.

In a possible implementation, the WUS or the second message further includes a PUCCH sending time offset, and the PUCCH sending time offset includes a time interval between a time point at which the WUS is received and a time point at which PUCCH feedback information is sent, or a time interval between a start time of the terminal device in a wake-up mode of a discontinuous reception DRX state and a time point at which PUCCH feedback information is sent.

According to a second aspect, a WUS detection method is provided. A network side device sends a WUS to a terminal device, where the WUS includes a terminal device-specific field.

The terminal device detects the terminal device-specific field in the detected WUS.

If the terminal device detects the terminal device-specific field in the WUS, and detects that the WUS includes wake-up information for the terminal device, the terminal device determines, by using location information of the terminal device-specific field as a first index, a first PUCCH resource corresponding to the first index, and sends a first PUCCH, where the first PUCCH includes a first message used to feed back that the wake-up information for the terminal device is received. The network side device receives the first PUCCH sent by the terminal device by using the preconfigured first PUCCH resource, and determines, based on the first message that is used to feed back that the wake-up information for the terminal device is received and that is included in the first PUCCH, that the terminal device receives the wake-up information.

In a possible implementation, before sending the WUS to the terminal device, the network side device sends a second message to the terminal device, and the terminal device receives the second message sent by the network side device, where the second message is used to configure the first PUCCH resource used when the terminal device feeds back information.

In a possible implementation, if the WUS includes a WIF, the terminal device determines identification information of the terminal device, and determines a location of the terminal device-specific field in the WUS based on the identification information and the WIF.

In a possible implementation, if the WUS does not include a WIF, the terminal device determines identification information of the terminal device, and determines a location of the terminal device-specific field in the WUS based on the identification information.

In a possible implementation, the WUS or the second message further includes a PUCCH sending time offset, and the PUCCH sending time offset includes a time interval between a time point at which the WUS is received and a time point at which PUCCH feedback information is sent, or a time interval between a start time of the terminal device in a wake-up mode of a discontinuous reception DRX state and a time point at which PUCCH feedback information is sent.

According to a third aspect, a WUS detection method is provided. A network side device sends a WUS to a terminal device, where the WUS includes a terminal device-specific field. The terminal device detects the terminal device-specific field in the detected WUS. If the terminal device detects the terminal device-specific field in the WUS, and detects that the WUS includes wake-up information for the terminal device, the terminal device sends a first physical uplink control channel PUCCH by using a preconfigured first PUCCH resource, where the first PUCCH includes a first message used to feed back that the wake-up information for the terminal device is received. The network side device receives the first PUCCH sent by the terminal device by using the preconfigured first PUCCH resource, and determines, based on the first message that is used to feed back that the wake-up information for the terminal device is received and that is included in the first PUCCH, that the terminal device receives the wake-up information.

In a possible implementation, the WUS is a UE-specific PDCCH WUS.

In a possible implementation, if the terminal device does not detect the UE-specific PDCCH WUS, the terminal device attempts to detect a group-based WUS.

In a possible implementation, if the terminal device does not detect the group-based WUS, the terminal device sends a second PUCCH by using a preconfigured second PUCCH resource, where the second PUCCH includes a third message used to feed back that the group-based WUS is not received.

For example, the network side device receives the second PUCCH sent by the terminal device by using the second PUCCH resource, and determines, based on the third message that is used to feed back that the group-based WUS is not received and that is included in the second PUCCH, that the terminal device does not receive the wake-up information. The network side device may preconfigure the second PUCCH for the terminal device, where information about the second PUCCH is used to feed back a message of which the terminal device does not receive the wake-up information.

In a possible implementation, before sending the WUS to the terminal device, the network side device sends a second message to the terminal device, and the terminal device receives the second message sent by the network side device, where the second message is used to configure the first PUCCH resource used when the terminal device feeds back information.

In a possible implementation, if the WUS includes a WIF, the terminal device determines identification information of the terminal device, and determines a location of the terminal device-specific field in the WUS based on the identification information and the WIF.

In a possible implementation, if the WUS does not include a WIF, the terminal device determines identification information of the terminal device, and determines a location of the terminal device-specific field in the WUS based on the identification information.

In a possible implementation, the WUS or the second message further includes a PUCCH sending time offset, and the PUCCH sending time offset includes a time interval between a time point at which the WUS is received and a time point at which PUCCH feedback information is sent, or a time interval between a start time of the terminal device in a wake-up mode of a discontinuous reception DRX state and a time point at which PUCCH feedback information is sent.

According to a fourth aspect, a WUS detection method is provided. A terminal device attempts to detect a UE-specific PDCCH WUS. If the UE-specific PDCCH WUS is detected, the terminal device determines that the WUS is received; if the UE-specific PDCCH WUS is not detected, the terminal device attempts to detect a group-based WUS. If the group-based WUS is not detected, the terminal device determines that downlink channel quality is relatively poor, and may perform link recovery. The terminal device may send a second PUCCH by using a second PUCCH resource.

If the group-based WUS is detected, the terminal device detects a terminal device-specific field and wake-up information for the terminal device in the group-based WUS. If the terminal device-specific field or the wake-up information for the terminal device is not detected, it is determined that a network side device does not wake up the terminal device. If the group-based WUS is detected, and a terminal device-specific field and wake-up information for the terminal device are detected in the group-based WUS, it is determined that the network side device wakes up the terminal device.

In a possible implementation, if the group-based WUS is detected, the terminal device detects a terminal device-specific field in the group-based WUS, and if the terminal device-specific field is detected, the terminal device detects wake-up information for the terminal device in the terminal device-specific field.

According to a fifth aspect, a WUS detection apparatus is provided. The apparatus provided in this application has a function of implementing the terminal device or the network side device in the aspects of the foregoing methods, and includes corresponding means configured to perform the steps or the functions described in the aspects of the foregoing methods. The steps or functions may be implemented by using software, hardware (for example, a circuit), or a combination of hardware and software.

In a possible design, the apparatus includes one or more processors and a communications unit. The one or more processors are configured to support the apparatus in performing a corresponding function of the terminal device or the network side device in the foregoing methods. Optionally, the apparatus may further include one or more memories. The memory is configured to be coupled to the processor, and the memory stores program instructions and/or data necessary for the apparatus. The one or more memories may be integrated with the processor, or may be disposed separately from the processor. This is not limited in this application.

In another possible design, the apparatus may include a transceiver, a processor, and a memory. The processor is configured to control the transceiver or an input/output circuit to send and receive a signal, and the memory is configured to store a computer program. The processor is configured to run the computer program in the memory, to enable the apparatus to perform the method completed by the terminal device or the network side device in any one of the first aspect or the possible implementations of the first aspect.

In a possible design, the apparatus includes one or more processors and a communications unit. The one or more processors are configured to support the apparatus in performing a corresponding function of the terminal device or the network side device in the foregoing methods. Optionally, the apparatus may further include one or more memories. The memory is configured to be coupled to the processor, and the memory stores program instructions and/or data necessary for the terminal device or the network side device. The one or more memories may be integrated with the processor, or may be disposed separately from the processor. This is not limited in this application.

The apparatus may be located in the terminal device or the network side device, or may be the terminal device or the network side device.

In another possible design, the apparatus includes a transceiver, a processor, and a memory. The processor is configured to control the transceiver or an input/output circuit to send and receive a signal, and the memory is configured to store a computer program. The processor is configured to run the computer program in the memory, to enable the apparatus to perform the method completed by the terminal device or the network side device in any one of the first aspect, the second aspect, the third aspect, and the fourth aspect or the possible implementations of the first aspect, the second aspect, the third aspect, and the fourth aspect.

According to a sixth aspect, a computer-readable storage medium is provided, and is configured to store a computer program. The computer program includes instructions used to perform the method according to any one of the first aspect, the second aspect, the third aspect, and the fourth aspect or the possible implementations of the first aspect, the second aspect, the third aspect, and the fourth aspect.

According to a seventh aspect, a computer program product is provided. The computer program product includes computer program code. When the computer program code is run on a computer, the computer is enabled to perform the method according to any one of the first aspect, the second aspect, the third aspect, and the fourth aspect or the possible implementations of the first aspect, the second aspect, the third aspect, and the fourth aspect.

According to an eighth aspect, a communications system is provided. The communications system includes a network side device and a terminal device, and the network side device and the terminal device are configured to implement the method according to any one of the first aspect, the second aspect, the third aspect, and the fourth aspect or the possible implementations of the first aspect, the second aspect, the third aspect, and the fourth aspect.

DESCRIPTION OF EMBODIMENTS

Figure 1:
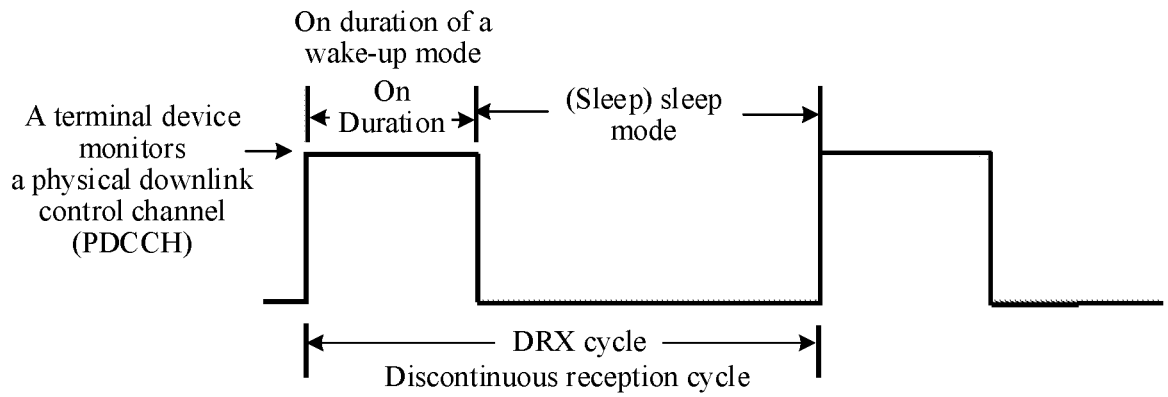
FIG. 1 is a schematic diagram of a DRX cycle.

The following further describes in detail embodiments of this application with reference to accompanying drawings. All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the term "example" in the embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

The following describes some terms in the embodiments of this application, to facilitate understanding of a person skilled in the art.

(1) A terminal device may be a device that provides a user with voice and/or data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus that exchanges voice and/or data with the radio access network. For example, the wireless terminal may be a device such as a personal communications service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, a user device, or user equipment. Examples of other terminal devices are a mobile phone, a tablet computer, a notebook computer, a palmtop computer, a mobile Internet device (MID), an intelligent point of sale (POS), a wearable device, a virtual reality (VR) device, an augmented reality (AR) device, and the like.

(2) A network side device is located in a communications system, and can provide an access service for the terminal device, so that the terminal device can access the Internet. For example, the network side device may be a base station device or an access point in the communications system. The base station device is, for example, a gNodeB (gNB), a gateway device, and a ground station device. Alternatively, the network side device may be a non-terrestrial network gateway (NTN-Gateway)/satellite gateway in a satellite communications system and the like.

(3) A wake-up signal (WUS) is a control signal used to reduce power consumption of the terminal device, and the WUS may include a terminal device-specific field. For example, in an idle state, the terminal device is generally in a sleep state. The terminal device attempts to receive the WUS. If receiving the WUS, the terminal device continues to attempt to receive a paging message used for wake-up. If the terminal device does not receive the WUS, the terminal device does not attempt to receive a paging message and continues to sleep, thereby reducing the power consumption of the terminal device. For example, the WUS may include a user equipment-specific PDCCH wake-up signal (UE-specific PDCCH WUS) and/or a group-based WUS.

(4) The terminal device-specific field (UE-specific field) is also referred to as a terminal device-specific bit field, and the terminal device-specific field is included in the WUS. The terminal device-specific field is a bit field that carries information allocated to a specific terminal device. Generally, the terminal device-specific field is used to carry related information of the terminal device, wake-up information used to indicate to wake up the terminal device, and other related information of the terminal device. For example, the other related information of the terminal device includes time-frequency resource switching indication information, a PUCCH sending time offset/sending time offset, activated or deactivated cross-slot scheduling indication information, and information indicating a maximum quantity of multiple-input multiple-output (MIMO) layers, where the time-frequency resource switching indication information may include BWP switching indication information. The network side device and the terminal device may determine the terminal device-specific field in the WUS by using a location of the terminal device-specific field. The location of terminal device-specific field may be used to indicate a sequence of the terminal device-specific field appearing in the WUS, or indicate a specific field that is used as the terminal device-specific field in the WUS.

(5) The wake-up information for the terminal device is used to indicate to wake up the terminal device. The wake-up information for the terminal device may be included in the WUS, and the WUS indicates to wake up the terminal device. Optionally, the WUS may explicitly indicate to wake up the terminal device, or the WUS may implicitly indicate to wake up the terminal device. For example, during explicit indication, the terminal device-specific field in the WUS indicates the wake-up information for the terminal device, and a specific bit in the terminal device-specific field indicates to wake up the terminal device. During implicit indication, the WUS indicates the wake-up information for the terminal device, and the WUS indicates to wake up the terminal device. For example, when the WUS is the UE-specific PDCCH WUS, the UE-specific PDCCH WUS implicitly indicates the wake-up information for the terminal device. Once the terminal device detects the UE-specific PDCCH WUS, it may be determined that the wake-up information for the terminal device is detected. When the WUS is the group-based WUS, the group-based WUS explicitly indicates the wake-up information for the terminal device, after the terminal device detects the group-based WUS, the wake-up information for the terminal device may be further detected by using the terminal device-specific field in the group-based WUS.

(6) A PUCCH resource is an uplink resource used when the terminal device sends uplink control information. The terminal device may feedback information, for example, hybrid automatic repeat request (HARQ) feedback information, to the network side device by using the PUCCH resource.

The term "and/or" in this application describes an association relationship between associated objects and indicates that three relationships may exist. For example, A and/or B may indicate the following three cases: Only A exists, both A and B exist, and only B exists. The character "/" generally indicates an "or" relationship between the associated objects.

In this application, "a plurality of" refers to two or more.

In addition, it should be understood that, in the description of this application, terms such as "first" and "second" are merely used for a purpose of distinguishing between descriptions, but cannot be understood as indication or implication of relative importance, and cannot be understood as an indication or implication of a sequence.

The technical solutions in the embodiments of this application may be applied to various communications systems, for example, a fourth generation (4G) system, including a long term evolution (LTE) system, a worldwide interoperability for microwave access (WiMAX) communications system, a 5th generation (5G) system such as a new radio access technology (NR), and a future communications system such as a 6G system.

For ease of understanding the embodiments of this application, the following describes application scenarios of this application.

The 3GPP standard organization is currently formulating a 5th generation (5G) cellular mobile communications system protocol standard, and 5G is also referred to as new radio (NR). Compared with a long term evolution (LTE) system, the NR supports a larger transmission bandwidth, more transceiver antenna arrays, a higher transmission rate, and a more flexible scheduling mechanism at a smaller granularity. Although the NR provides more application scopes based on the foregoing features, a power consumption burden of the terminal device is greatly increased. To reduce the power consumption of the terminal device, the 3GPP introduces a power saving research topic in the NR rel-16, to study a possible solution for reducing the power consumption of the terminal device in various states (including a connected state Connection, an idle state, and an inactive state), and how to reduce the power consumption of the terminal device in the connected state is a research focus.

In the LTE system, the 3GPP designs a discontinuous reception (DRX) mechanism to reduce the power consumption of the terminal device in the connected state. In the DRX mechanism, the terminal device starts an inactive timer in an active state of the connected state, and the terminal device continuously attempts to receive a physical downlink control channel (PDCCH). If the terminal device receives scheduling downlink control information (DCI) on the PDCCH, the terminal device restarts the inactive timer. If the terminal device does not receive scheduling DCI within a period of time, and the inactive timer expires, the terminal device enters a DRX inactive state.

As shown in FIG. 1, a basic time unit of a DRX state is a DRX cycle, a time length of the DRX cycle is a DRX periodicity, and one DRX cycle includes a sleep state (that is, the inactive state) and an on duration state. The on duration, that is a wake-up mode, is also referred to as DRX_ON. When the DRX cycle enters the on duration state, the terminal device is woken up and monitors the PDCCH. Once the scheduling DCI is received on the PDCCH, the terminal device restarts the inactive timer for timing. If the inactive timer expires, the terminal device returns to the sleep mode. The sleep state, that is, the sleep mode, is also referred to as DRX_OFF. The terminal device in the sleep mode may completely disable communications components such as a radio frequency transceiver and a baseband processor, to reduce power consumption.

It should be noted that generally, the terminal device does not wake up when the on duration approaches, but first wakes up in several slots before the on duration approaches, and receives a downlink reference signal to perform time-frequency offset synchronization, to prevent an offset between a clock and a working frequency of a system and a clock and a working frequency of a base station due to long-time sleep of the terminal device. In addition, the terminal device may first attempt to receive a downlink synchronization signal and a system update message, to avoid that a system message expires after the terminal device moves from one cell to another cell.

In addition, in the LTE system, the 3GPP further designs a WUS. The WUS is a control signal introduced in a narrowband Internet of Things (NB-IoT) to reduce power consumption of the terminal device, and is mainly applied to a paging mechanism in the idle state. In the idle state, the terminal device is generally in the sleep state, but the terminal device needs to wake up every period of time to attempt to receive a paging message. A time period in which the terminal device is woken up to receive the paging message is referred to as a paging occasion (PO). In an actual system, a base station does not send a paging message to the terminal device on every PO. Therefore, it is an ineffective operation for the terminal device to wake up to receive a paging message on a PO in most of the time, and this increases power consumption of the terminal device. Therefore, the WUS is introduced in the NB-IoT system. If the base station indeed sends a paging message to the terminal device on a PO, the base station sends a WUS before the PO approaches. If the base station does not send a paging message to the terminal device on a PO, the base station does not send a WUS. Correspondingly, the terminal device attempts to receive the WUS before the PO approaches. If the terminal device receives the WUS, the terminal device determines that a paging message exists on a subsequent PO, and the terminal device continues to attempt to receive the paging message. If the terminal device does not receive the WUS, the terminal device considers that a paging message does not exist on a subsequent PO, and the terminal device does not attempt to receive the paging and continues to sleep. Power consumption and complexity when the terminal device receives the WUS are far less than power consumption and complexity when the terminal device attempts to receive the paging message, and a probability that the base station sends the paging message in the idle state of the terminal device is not high. Therefore, it is determined, based on whether the WUS is received, whether the terminal device wakes up. This can greatly reduce the power consumption of the terminal device.

The NR Rel-16 considers introducing a PDCCH-based WUS, also referred to as a PDCCH WUS, that is, the WUS is carried by using the PDCCH. In a possible embodiment, the WUS may be carried by using PDCCH DCI, that is, the WUS is carried by using the scheduling DCI in the PDCCH. The PDCCH includes at least a UE-specific PDCCH WUS and a group-based (PDCCH) WUS. The UE-specific PDCCH WUS is a signal sent to a single terminal device. To be specific, the PDCCH DCI carries a WUS signal of only one terminal device. For a signal format of the group-based WUS, refer to FIG. 2. The group-based WUS carries WUS signals of N terminal devices, including 1 to N terminal device-specific fields, that is, terminal device-specific field(s), also referred to as terminal device-specific bit fields. The terminal device-specific field carries information about the WUS signal of the terminal device. In addition, the group-based WUS further includes a cyclic redundancy check (CRC) bit. In a possible embodiment, the terminal device may check, based on the CRC bit, whether a received group-based WUS is a normal WUS or a false alarm WUS.

In addition to a wake-up indication, the PDCCH WUS may further carry other configuration information. For example, the other configuration information may include a configuration parameter of the terminal device in a power consumption reduction state. The other configuration information may include time-frequency resource switching indication information, for example, include an operating bandwidth part (BWP) used after the terminal device wakes up. Generally, the terminal device may camp in a BWP with a narrow bandwidth to detect a WUS. The WUS indicates the operating BWP used after the terminal device wakes up. The operating BWP has a larger bandwidth and has a higher data transmission rate, so that it is more convenient for the terminal device to perform data transmission in the operating BWP after waking up. For example, the PDCCH WUS may carry identification information of a target BWP. The terminal device obtains the identification information of the BWP in the PDCCH WUS through parsing, and switches to a new target BWP for data transmission. The UE-specific PDCCH WUS can carry a large amount of configuration information of the terminal device. The large amount of configuration information of the terminal device may occupy resources in an entire PDCCH, and occupied resource overheads are relatively high. Compared with the UE-specific PDCCH WUS, the group-based WUS can carry configuration information of more terminal devices, but may carry a small amount of configuration information for each terminal device. Compared with using the UE-specific PDCCH WUS, less downlink control signaling can be occupied when a network side device wakes up the terminal device by using the group-based WUS.

The time-frequency resource switching indication information needs to have relatively high reliability because if the time-frequency resource switching indication information is incorrectly received or not detected, the terminal device does not switch to a time-frequency resource specified by the network side device to receive downlink data, but in this case, the network side device has switched to the specified time-frequency resource to send scheduling DCI. The terminal device uses a time-frequency resource previously configured by the network side device or a wrong time-frequency resource to receive data. As a result, a downlink resource of the terminal device does not match a downlink resource of the network side device. If this case occurs, the terminal device and the network side device switch to a default time-frequency resource only after a specified timer expires, and restart data scheduling. The specified timer may be different from an inactive timer of DRX. However, it takes a relatively long time to wait for the specified timer to expire, and this causes a large data transmission delay. Therefore, a solution is that the terminal device sends feedback information, for example, hybrid automatic repeat request (HARQ) feedback information, for a WUS sent by the network side device, to notify the network side device whether the terminal device correctly receives the WUS, or notify the network side device whether the terminal device receives wake-up information.

The terminal device generally sends feedback information on a physical uplink control channel (PUCCH), and the feedback information needs to occupy an uplink time-frequency resource. When indicating time-frequency resource switching information in the WUS, the network side device also indicates a PUCCH resource used when the terminal device feeds back information, and the PUCCH resource is a PUCCH resource used when the terminal device feeds back information.

Descriptions are provided below by using an example in which the time-frequency resource switching indication information includes the operating BWP used after the terminal device wakes up.

First, a BWP is briefly described. Compared with an LTE system, different bandwidths may be configured for a network side device and a terminal device in an NR system, and the terminal device may configure a maximum operating bandwidth of the terminal device based on a service requirement and manufacturing costs of the terminal device. For example, an operating bandwidth of a low-cost and low-rate terminal device may be only 5 MHz (Mega Hertz), and an operating bandwidth of a high-rate and high-performance terminal device may reach 100 MHz. If a carrier bandwidth of a cell is set based on a low-cost and low-rate terminal device (for example, set to 5 MHz to 10 MHz), a high-rate and high-performance terminal device may need to use a carrier aggregation manner to obtain a relatively high rate, and this inevitably increases control signaling overheads and processing complexity. If a carrier bandwidth of a cell is set based on a high rate and high performance (for example, set to 100 MHz), a low-cost and low-performance terminal device may need to be equipped with a radio frequency component and a baseband component that are suitable for large bandwidth, to access the cell, and this undoubtedly increases costs. Therefore, a concept of a BWP is introduced in NR. A BWP is a segment of continuous frequency resources on a carrier of a cell. The network side device may configure BWPs having different bandwidth sizes for different terminal devices. After the BWP is configured and activated, the BWP is referred to as an active BWP. Uplink data and control information sent by the terminal device or downlink data and control information received by the terminal device are completed in the active BWP. In the NR Rel-15 protocol, one terminal device can have only one active BWP in an uplink and a downlink respectively. Therefore, to enable the terminal device to operate in a corresponding BWP to receive and send data at different moments based on a service requirement, the NR allows to trigger, by using scheduling DCI, the terminal device to perform BWP switching, where different DCI may be used to indicate different BWPs. The scheduling DCI is referred to as scheduling DCI or the scheduling DCI is also referred to as DCI for scheduling data, and may include DCI (for example, format 11) for scheduling the terminal device to receive downlink physical downlink shared channel (PDSCH) data or may include DCI (for example, format 0_1) for scheduling the terminal device to send uplink physical uplink shared channel (PUSCH) data. After receiving the scheduling DCI, the terminal device receives or sends data in a new BWP indicated by the DCI.

Figure 3:
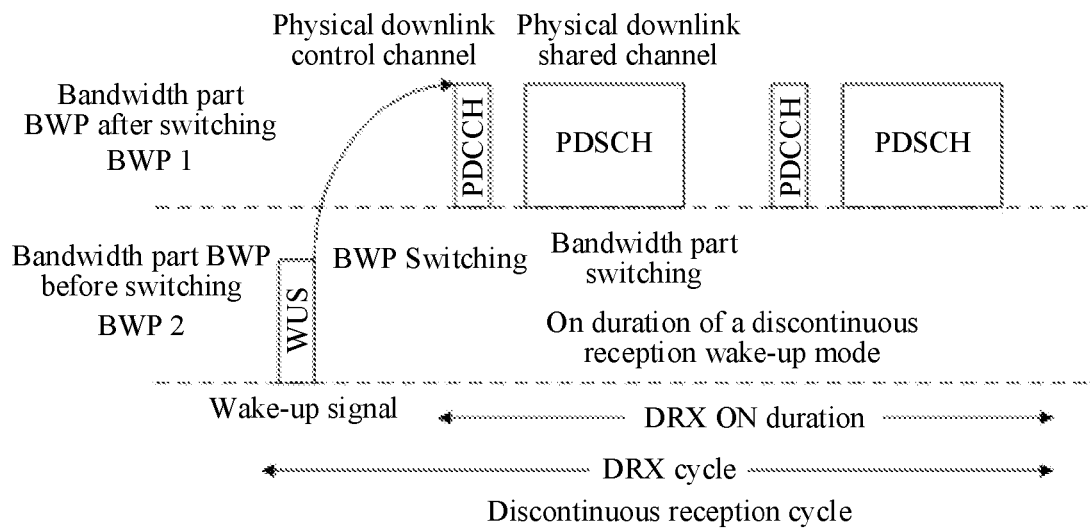
FIG. 3 is a schematic diagram of BWP switching by a terminal device.

As shown in FIG. 3, in a DRX cycle, the terminal device receives, in a BWP 2, a WUS sent by the network side device, where the WUS indicates to wake up the terminal device and indicates the terminal device to switch to a BWP 1 to operate, and the DRX cycle enters on duration. The terminal device wakes up and switches to the BWP 1, and the terminal device detects a PDCCH and a PDSCH in the BWP 1.

When the WUS sent by the network side device indicates the terminal device to switch to a new operating BWP, the WUS further indicates a PUCCH resource for sending HARQ feedback information by the terminal device. Information used to indicate the PUCCH resource for sending the HARQ feedback information by the terminal device may include the following content: KI and a HARQ resource indicator (ARI), where KI is used to indicate a time interval between a slot in which the network side device sends the WUS and a slot in which the terminal device sends the HARQ feedback information. The ARI is specifically used to indicate a specific PUCCH resource used for feedback of the WUS, and may include one or more of identification information of the PUCCH resource, an occupied frequency domain position (for example, a start physical resource block (PRB)), and a PUCCH resource format.

Generally, at least 2 to 3 bits are required to indicate KI, and at least 2 to 3 bits are required to indicate the ARI. Therefore, for each terminal device, at least 4 to 6 bits are required to indicate the PUCCH resource for sending the HARQ feedback information. Therefore, in a UE-specific PDCCH WUS, at least 4 to 6 bits are required to indicate the PUCCH resource for sending the HARQ feedback information by the terminal device. In a group-based WUS, for each terminal device, at least 4 to 6 bits are required to indicate the PUCCH resource for sending the HARQ feedback information by the terminal device. It is assumed that one group-based WUS indicates five terminal devices in total, and information that is used to indicate PUCCH resources used when the five terminal devices feedback information and that is in the group-based WUS needs to occupy 25 bits, a sum of the 25 bits and a quantity of bits of wake-up information used to wake up the terminal device may exceed a quantity of bits that can be carried by the group-based WUS. Alternatively, if a payload of the group-based WUS is 40 bits, PUCCH resources used to indicate the five terminal devices to send HARQ feedback information occupy more than 60% of bits of the group-based WUS, and an excessively large quantity of bits are occupied. Therefore, a bit rate of the group-based WUS is increased, and receiving performance of the group-based WUS is reduced. The payload is a payload, and is a pure information part other than a header in an information element.

Therefore, to ensure that information that indicates a PUCCH resource for feedback information and that is carried in a WUS does not exceed a quantity of bits that can be carried by the WUS, and to ensure receiving performance of the WUS, when the network side device sends the WUS, especially when sending the group-based WUS, a quantity of terminal devices indicated in the group-based WUS may be reduced, for example, reduced from multiplexing five terminal devices to multiplexing three terminal devices. In this way, when a total quantity of terminal devices that need to be indicated remains unchanged, more group-based WUSs need to be sent to indicate all of the terminal devices. This also causes excessively high signaling overheads of the network side device and downlink system capacity reducing.

In view of this, to reduce signaling overheads of a network side device and improve a downlink system capacity, this application provides a wake-up signal WUS detection method to ensure that no PUCCH resource is indicated in a WUS delivered by the network side device, to reduce the signaling overheads of the network side device.

According to the method, a PUCCH resource used to feed back information is preconfigured in a terminal device. Therefore, the terminal device may feed back, by using the PUCCH resource, whether a message of wake-up information for the terminal device is received. Therefore, a WUS sent by the network side device to the terminal device includes at least wake-up information used to indicate to wake up the terminal device. One WUS may carry wake-up information for as many terminal devices as possible, so that signaling overheads caused by indicating the PUCCH resource in the WUS can be reduced, and signaling overheads of the network-side device is reduced.

Figure 4:
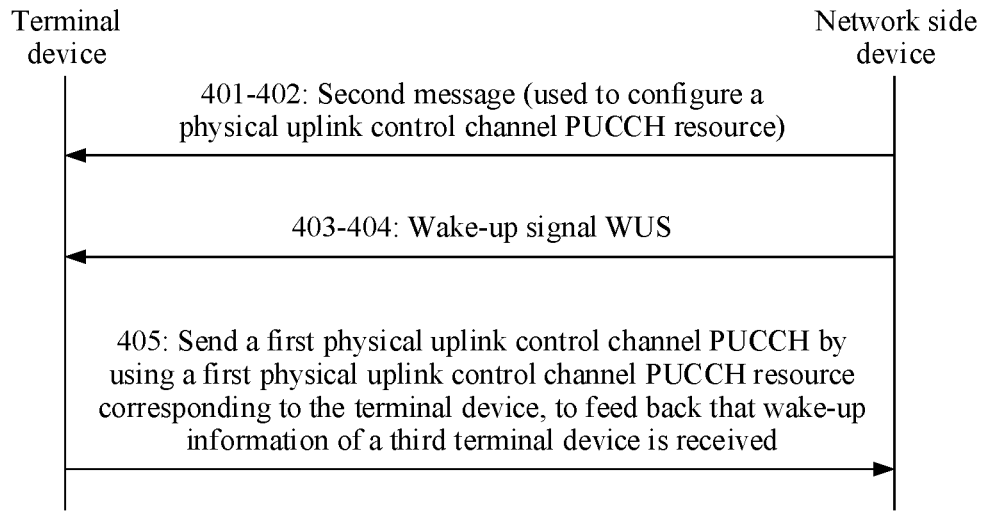
FIG. 4 is a schematic diagram of a WUS detection procedure applicable to an embodiment of this application.

With reference to FIG. 4, the following describes in detail a specific process of the WUS detection method. As shown in FIG. 4, the process includes the following steps.

Step 401: A network side device sends a second message to a first terminal device. The second message is used to configure a first PUCCH resource used when a terminal device feeds back information. In this step, a terminal device for which a PUCCH resource is preconfigured is referred to as the first terminal device, and there may be one or more first terminal devices.

The network side device may use each terminal device connected to the network side device as the first terminal device for which the PUCCH resource is preconfigured.

Alternatively, before sending a WUS to the terminal device, the network side device may first determine a to-be-woken-up terminal device. The to-be-woken-up terminal device is referred to as a second terminal device herein. The network side device may determine, from the second terminal devices, the first terminal device for which the PUCCH resource is preconfigured. That is, it is assumed that there are N to-be-woken-up second terminal devices, and the network side device determines M first terminal devices from the N second terminal devices, where M≤N. For example, generally, when the network side device indicates the terminal device to switch a time-frequency resource, it is possible that both the network side device and the terminal device do not subsequently switch to a same time-frequency resource. As a result, an uplink resource and a downlink resource are mismatched and data is incorrectly transmitted and received. Therefore, the network side device may select, from the second terminal devices, a terminal device that switches a time-frequency resource as the first terminal device for which the PUCCH resource is preconfigured.

In an implementation, the second message includes the first PUCCH resource used when only one specific first terminal device feeds back information. Generally, the specific first terminal device is further configured to receive the second message.

In another implementation, the second message may include the first PUCCH resource used when each first terminal device feeds back information.

In this implementation, the second message may specifically include the first PUCCH resource used when the first terminal device feeds back information and a corresponding index. Subsequently, the terminal device may find, by using an index, the first PUCCH resource corresponding to the terminal device.

Optionally, the second message may further include a PUCCH sending time offset, and the PUCCH sending time offset is used to indicate a time point at which the terminal device sends a PUCCH. The PUCCH sending time offset includes a time interval between a time point at which the WUS is received and a time point at which PUCCH feedback information is sent, or a time interval between a start time of the terminal device in a wake-up mode of a DRX state and a time point at which PUCCH feedback information is sent.

Optionally, the second message sent by the network side device to the first terminal device may be specifically further used to configure an uplink BWP of the first terminal device, and configure the first PUCCH resource for each uplink BWP. Subsequently, the terminal device may operate in the uplink BWP, and send uplink data (for example, uplink control information) by using the first PUCCH resource.

The network side device may send the second message by using signaling. For example, the signaling may be radio resource control (RRC) signaling, may reuse other existing signaling, or may be customized signaling that is newly added. This is not limited herein.

Step 402: The first terminal device receives the second message sent by the network side device.

The first terminal device receives the second message sent by the network side device, and configures, for the first terminal device, the first PUCCH resource that is used when the terminal device feeds back information and that is included in the second message.

Optionally, if the uplink BWP of the first terminal device is further configured in the second message sent by the network side device to the first terminal device, the first terminal device may switch, based on an indication of the second message after being woken up, to the uplink BWP for operation, and send uplink data by using a first PUCCH resource corresponding to the uplink BWP.

Step 403: The network side device sends the WUS to the second terminal device.

Before sending the WUS to the terminal device, the network side device may first determine the to-be-woken-up terminal device. The to-be-woken-up terminal device is referred to as the second terminal device herein, and there may be one or more to-be-woken-up second terminal devices. The network side device may send the WUS to the to-be-woken-up second terminal device. Specifically, the network side device generates the WUS based on the to-be-woken-up second terminal device, and then delivers the generated WUS to the second terminal device.

If the network side device uses each terminal device connected to the network side device as the first terminal device for which the PUCCH resource is preconfigured, not all the first terminal devices configured with the PUCCH resource may need to be woken up. Therefore, the to-be-woken-up second terminal device may be understood as a part (or all) of terminal devices of the first terminal devices configured with the PUCCH resource.

In an example, the WUS sent by the network side device to the second terminal device includes a UE-specific PDCCH WUS. In this example, when generating the UE-specific PDCCH WUS, the network side device may directly include, in the UE-specific PDCCH WUS, wake-up information used to wake up the second terminal device and other related information of the second terminal device.

Alternatively, the network side device determines a location of a second terminal device-specific field in the UE-specific PDCCH WUS, and includes wake-up information for the second terminal device and/or other related information of the second terminal device in the second terminal device-specific field.

The UE-specific PDCCH WUS may include one second terminal device-specific field. Specifically, all information in the UE-specific PDCCH WUS may be considered as the second terminal device-specific field.

In another example, the WUS sent by the network side device to the second terminal device includes a group-based WUS. In this example, when generating the group-based WUS, the network side device may determine, based on the to-be-woken-up second terminal device, a location of the to-be-woken-up second terminal device-specific field in the group-based WUS. The location of the second terminal device-specific field in the group-based WUS may be used to indicate a specific terminal device-specific field that is used as the second terminal device-specific field in the group-based WUS, that is, a sequence of the second terminal device-specific field appearing in a specific field of the group-based WUS. The network side device may include the wake-up information for the second terminal device and the other related information of the second terminal device in the group-based WUS. Optionally, the network side device may further include the wake-up information for the second terminal device and/or the other related information of the second terminal device in the terminal device-specific field.

The group-based WUS includes one or more second terminal device-specific fields.

In an implementation, the network side device may determine the location of the second terminal device-specific field in the WUS based on identification information of the second terminal device.

Optionally, identification information of the terminal device may include an identifier of the terminal device, and may be one or more of a unique identifier (ID) of the terminal device, a radio network temporary identity (RNTI), and the like.

For example, the identification information of the terminal device is the identifier of the terminal device. The network side device may perform a modulo operation on an identifier of the second terminal device, and use a result of the modulo operation as location information of the second terminal device-specific field in the WUS.

Figure 2:
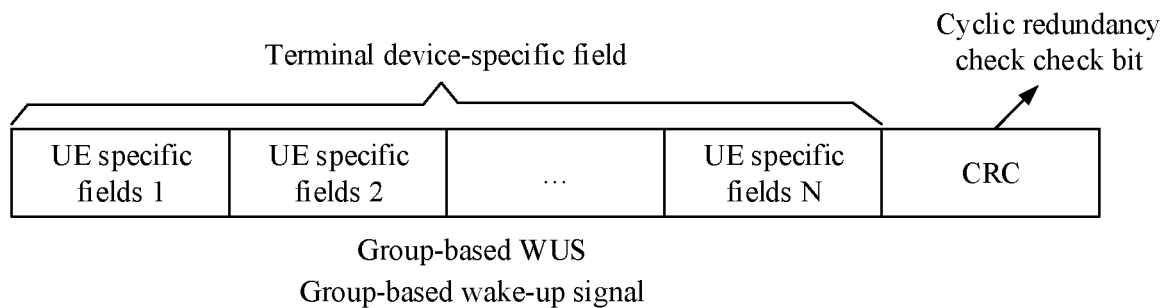
FIG. 2 is a schematic diagram of a signal format of a group-based WUS.

In this implementation, a structure of the WUS generated by the network side device based on the determined location of the second terminal device-specific field in the WUS may be that shown in FIG. 2. FIG. 2 includes 1 to N second terminal device-specific fields and CRC check bits.

In another implementation, the network side device may include a wake-up indicator field (WIF) in the WUS, and the network side device determines location information of the second terminal device-specific field in the WUS based on the identification information of the second terminal device and the WIF.

For example, the identification information of the terminal device is the identifier of the terminal device. The network side device may perform calculation on the identification information of the second terminal device and the WIF, for example, perform addition, subtraction, multiplication, and division (where a result of the division operation can be rounded down or rounded up), a modulo operation, and the like, and determine the location information of the second terminal device-specific field in the WUS based on a calculation result.

Figure 5:
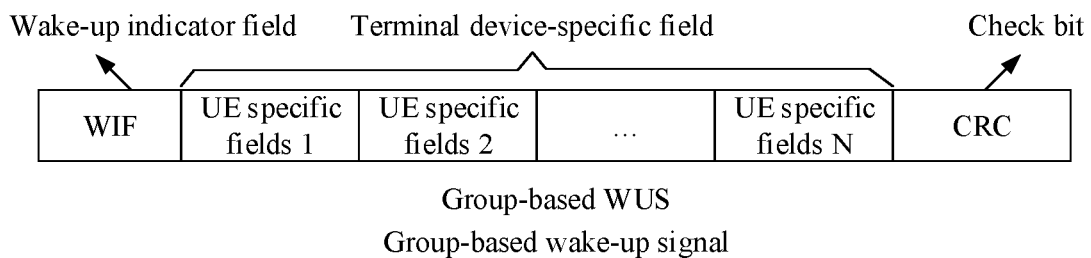
FIG. 5 is a schematic diagram of a structure of a WUS applicable to an embodiment of this application.

In this implementation, a structure of the WUS generated by the network side device based on the determined location of the second terminal device-specific field in the WUS may be that shown in FIG. 5. FIG. 5 includes a WIF, 1 to N second terminal device-specific fields, and CRC check bits. In an actual structure of the WUS, the WIF may be located at the head, middle, or tail of the WUS. This may not be limited.

Optionally, the other related information of the second terminal device may further include a PUCCH sending time offset and/or time-frequency resource switching indication information.

For example, the time-frequency resource switching indication information may include BWP switching indication information. The BWP switching indication information may be information about an operating BWP for receiving downlink data by the terminal device, and the information about the operating BWP for receiving the downlink data by the terminal device may be identification information of a BWP. Specifically, the operating BWP for receiving the downlink data by the terminal device may be an operating BWP for receiving downlink data by the terminal device during DRX ON (that is, a wake-up mode of a DRX state).

The PUCCH sending time offset includes a time interval between a time point at which the WUS is received and a time point at which PUCCH feedback information is sent, or a time interval between a start time of the terminal device in a wake-up mode of a DRX state and a time point at which PUCCH feedback information is sent.

Figure 6:
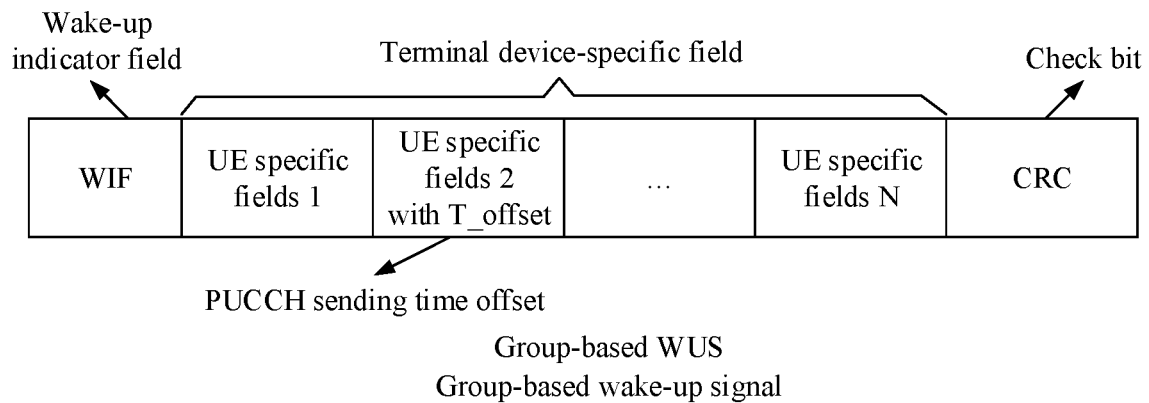
FIG. 6 is a schematic diagram of a structure of a WUS applicable to an embodiment of this application.

In actual application, both the second message and/or the WUS may include a PUCCH sending time offset. When the second message includes a PUCCH sending time offset, a structure of the WUS may be that shown in FIG. 2 or FIG. 5. When the WUS includes a PUCCH sending time offset, a structure of the WUS may be that shown in FIG. 6, and FIG. 6 is an improvement based on FIG. 5. FIG. 6 includes a WIF, 1 to N second terminal device-specific fields, and CRC check bits, and the second terminal device-specific field includes a PUCCH sending time offset T_offset.

The second message includes the PUCCH sending time offset, so that signaling overheads in the WUS can be less occupied. Compared with the PUCCH sending time offset included in the second message, although the PUCCH sending time offset included in the WUS occupies a small quantity of signaling overheads in the WUS, flexibility of uplink PUCCH transmission can be improved.

Step 404: If a third terminal device detects the WUS sent by the network side device, the third terminal device detects a terminal device-specific field in the WUS, and detects wake-up information for the terminal device in the WUS.

If a downlink PDCCH resource is blocked or downlink channel quality is poor, the network side device may not be able to send the WUS, or the terminal device does not detect the WUS sent by the network side device. Therefore, in this step, a terminal device that detects the WUS sent by the network side device is referred to as the third terminal device, to distinguish from the second terminal device, where the third terminal device is a part or all of the second terminal devices. Before receiving the WUS, the terminal device may further attempt to detect the WUS.

In an example, if the terminal device is in a DRX state, the terminal device monitors a PDCCH channel, and detects, on the PDCCH channel, whether the WUS is received.

If the third terminal device detects the UE-specific PDCCH WUS or the group-based WUS, it may be considered that the WUS is detected.

In another example, the third terminal device attempts to detect the UE-specific PDCCH WUS. Because all information in the UE-specific PDCCH WUS may be considered as the terminal device-specific field, if the UE-specific PDCCH WUS is detected, the third terminal device may determine that the WUS exists. If the terminal device does not detect the UE-specific PDCCH WUS, the third terminal device attempts to detect the group-based WUS. If the group-based WUS is detected, because the group-based WUS generally includes a plurality of terminal device-specific fields, the third terminal device may further detect the terminal device-specific field in the group-based WUS, to determine whether a third terminal device-specific field and wake-up information for the third terminal device exist, to determine whether the WUS is detected.

If the third terminal device detects the WUS, the third terminal device detects the third terminal device-specific field in the detected WUS, and detects the wake-up information for the third terminal device in the WUS. For the UE-specific PDCCH WUS, all control information in the UE-specific PDCCH WUS is considered as the third terminal device-specific field. The third terminal device may directly determine, based on the detected UE-specific PDCCH WUS, that the third terminal device-specific field exists. For the group-based WUS, some control information in the group-based WUS is the third terminal device-specific field. The third terminal device needs to determine a location of the third terminal device-specific field based on the detected group-based WUS, and then determines, based on the location of the third terminal device-specific field, whether the third terminal device-specific field exists.

A process in which the terminal device determines the location of the terminal device-specific field when receiving the WUS is basically the same as a process in which the network side device determines the location of the terminal device-specific field when generating the WUS.

In an implementation, if the WUS does not include a wake-up indicator field WIF, the third terminal device determines identification information of the third terminal device, and determines a location of the third terminal device-specific field in the WUS based on the identification information, thereby locating the location of the third terminal device-specific field in the WUS.

In another implementation, if the WUS includes a WIF, the third terminal device determines identification information of the third terminal device, and determines a location of the third terminal device-specific field in the WUS based on the identification information and the WIF. After determining location information of the third terminal device-specific field in the WUS, the third terminal device may detect the third terminal device-specific field at the location in the WUS. The WUS may further include wake-up information, and the third terminal device may further detect, in the WUS, whether the wake-up information for the third terminal device is included.

Optionally, the third terminal device-specific field in the WUS may include the wake-up information for the third terminal device.

Step 405: If the third terminal device detects the third terminal device-specific field in the WUS, and detects that the WUS includes the wake-up information for the third terminal device, the third terminal device determines the first PUCCH resource from the preconfigured PUCCH resources, and sends a first PUCCH, where the first PUCCH includes a first message used to feed back that the wake-up information for the third terminal device is received.

The network side device receives the first PUCCH, and determines, based on the first message included in the first PUCCH, that the terminal device receives the wake-up information.

The third terminal device stores the preconfigured first PUCCH resource used when information is fed back. For a process in which the network side device configures a PUCCH resource for the third terminal device, refer to step 401 and step 402.

The preconfigured first PUCCH resource that is used when the information is fed back and that is stored in the third terminal device may include only the first PUCCH resource used when the third terminal device feeds back information, or may include first PUCCH resources used when a plurality of terminal devices feed back information, where the plurality of terminal devices include the third terminal device.

If the first PUCCH resource stored in the third terminal device includes only the first PUCCH resource used when the third terminal device feeds back information, the third terminal device may directly determine the first PUCCH resource corresponding to the third terminal device.

If the first PUCCH resource stored in the third terminal device includes the first PUCCH resources used when the plurality of terminal devices feed back information, the third terminal device may determine, from the preconfigured first PUCCH resources, the first PUCCH resource corresponding to the location information of the third terminal device-specific field, where for the group-based WUS, the location of the third terminal device-specific field is a sequence of the third terminal device-specific field appearing in the specific field of the group-based WUS.

Optionally, the third terminal device determines, by using the location information of the third terminal device-specific field as a first index, the first PUCCH resource corresponding to the first index from the preconfigured first PUCCH resources.

Figure 7:
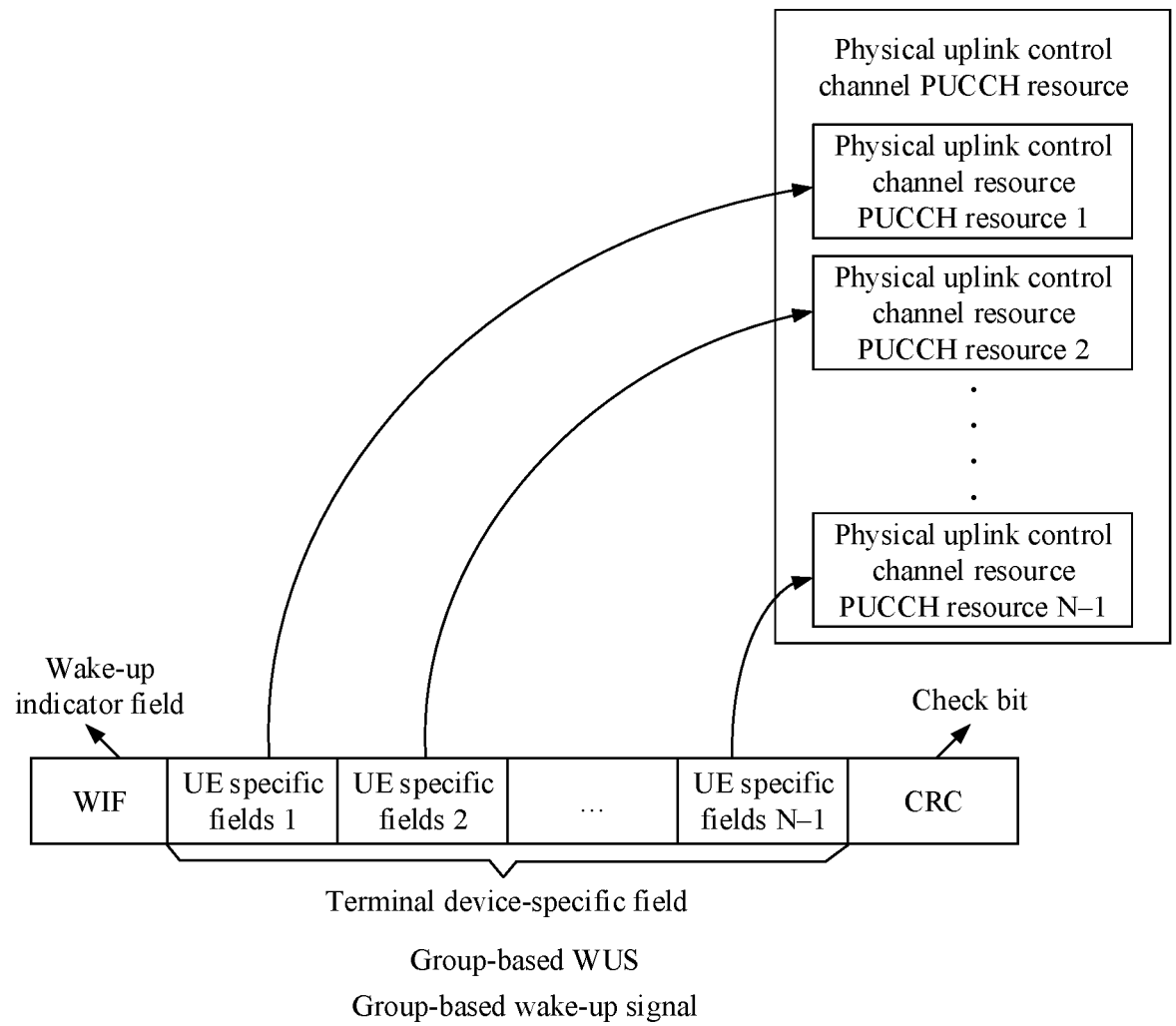
FIG. 7 is a schematic diagram of searching for a PUCCH resource applicable to an embodiment of this application.

FIG. 7 is a schematic diagram of searching for a PUCCH resource based on FIG. 5. A sequence of the terminal device-specific fields in the WUS is consistent with a sequence of PUCCH resources configured for the terminal device. Therefore, the terminal device may use the location information of the terminal device-specific field as an index, and search from the configured PUCCH resources for a PUCCH resource corresponding to the index. If a location of a UE-specific field 1 is 1 and an index is 1, a PUCCH resource corresponding to the index 1 in the configured PUCCH resources is a PUCCH resource 1, and a PUCCH resource corresponding to the terminal device is found.

If the WUS or the second message includes the PUCCH sending time offset, after determining the first PUCCH resource corresponding to the third terminal device, the third terminal device may send the first PUCCH on the first PUCCH resource corresponding to the third terminal device after the PUCCH sending time offset.

Figure 8:
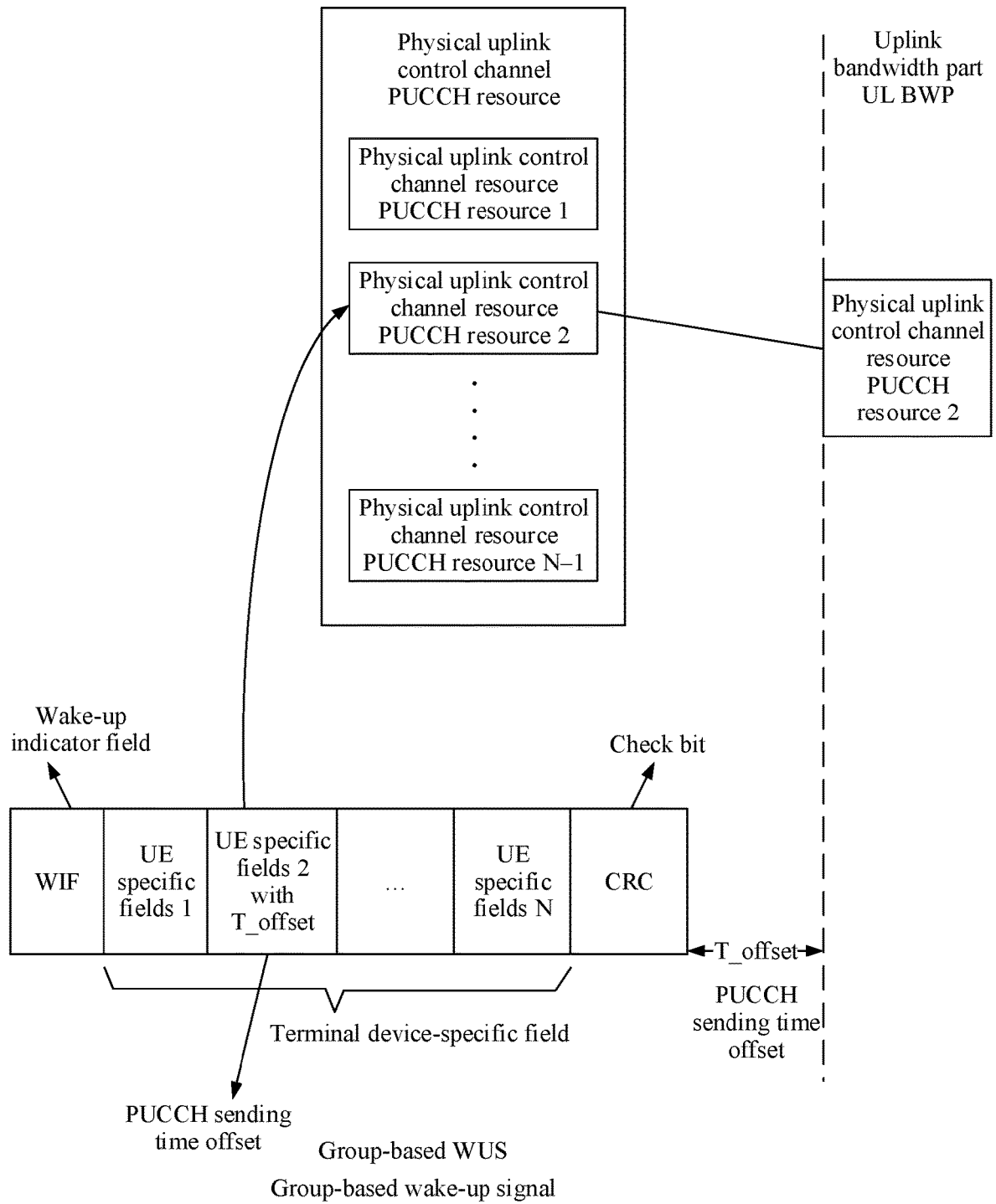
FIG. 8 is a schematic diagram of feeding back a PUCCH applicable to an embodiment of this application.

FIG. 8 is a schematic diagram of feeding back the first PUCCH based on FIG. 6. If the third terminal device-specific field is a UE-specific field 2, and the third terminal device-specific field includes the PUCCH sending time offset T_offset, and if the PUCCH sending time offset includes the time interval between the time point at which the WUS is received and the time point at which the PUCCH feedback information is sent, after a T_offset time point at which the third terminal device receives the WUS, the third terminal device sends the first PUCCH on the first PUCCH resource corresponding to the third terminal device, that is, a PUCCH resource 2 in an uplink bandwidth part UL BWP shown in FIG. 8.

If the third terminal device detects the wake-up information for the third terminal device in the WUS, the third terminal device may attempt to detect and schedule a PDCCH in the DRX ON.

If the third terminal device detects the time-frequency resource switching indication information in the third terminal device-specific field, the third terminal device may further switch to a time-frequency resource indicated in the WUS to operate. For example, the time-frequency resource switching indication information includes the BWP switching indication information. The third terminal device switches to an indicated BWP to operate, and performs data sending and receiving.

The first PUCCH includes the first message used to feed back that the wake-up information for the third terminal device is received. If the network side device receives the first PUCCH, the network side device determines, based on the first message included in the first PUCCH, that the third terminal device receives the wake-up information. Optionally, if the time-frequency resource switching indication information is indicated in the WUS, after receiving the first PUCCH, the network side device may further determine, based on the first message included in the first PUCCH, that the third terminal device switches to the indicated time-frequency resource to operate.

Optionally, if the terminal device does not receive the WUS, or the terminal device does not detect the terminal device-specific field in the received WUS, or the terminal device does not detect the wake-up information for the terminal device in the received WUS, it is determined that the terminal device does not receive the wake-up information for the terminal device. Alternatively, it may be considered that the terminal device does not receive the WUS, or the terminal device does not correctly receive scheduling DCI. The terminal device that does not receive wake-up information may be referred to as a fourth terminal device herein.

A second PUCCH resource may be preconfigured in the fourth terminal device. If the fourth terminal device determines that the wake-up information is not received, the fourth terminal device sends a second PUCCH by using the second PUCCH resource, where the second PUCCH includes a third message used to feed back that the wake-up information is not received.

In an example, if the fourth terminal device does not detect the UE-specific PDCCH WUS and does not detect the group-based WUS after attempting to detect the group-based WUS, the fourth terminal device determines that the WUS is not received. The third message may be further used to feed back that the group-based WUS is not received.

If the network side device receives the second PUCCH, based on the third message included in the second PUCCH, the network side device determines that the terminal device does not receive the wake-up information, or determines that the terminal device does not receive the group-based WUS, and further determines that the terminal device does not receive the wake-up information.

According to the solution provided in this embodiment of this application, PUCCH resources used to feed back information are preconfigured in the terminal device. After receiving the WUS sent to the terminal device, the terminal device can feed back, by using the first PUCCH resource corresponding to the terminal device in the preconfigured PUCCH resources, that the first message of the wake-up information for the terminal device is received. Therefore, a quantity of bits of feedback indication information carried in the WUS is reduced, a PDCCH code rate is reduced, signaling overheads of the network side device are reduced, and a downlink channel capacity is increased.

The following provides descriptions by using several specific embodiments.

Figure 9:
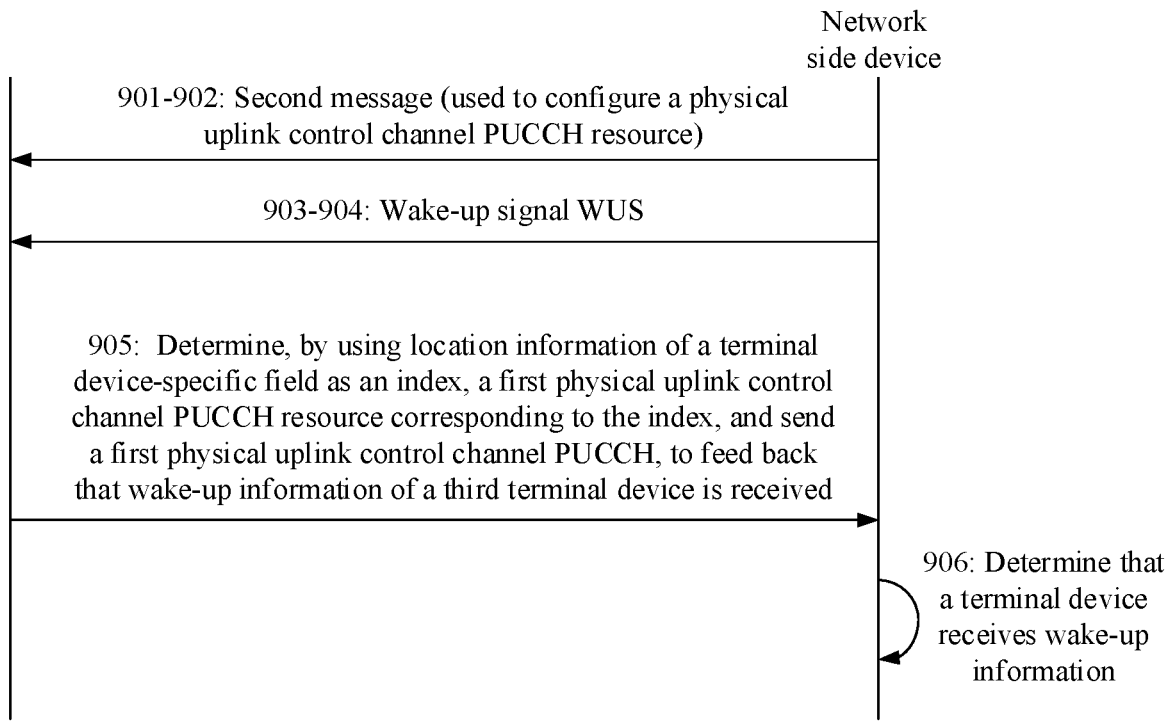
FIG. 9 is a schematic diagram of a WUS detection procedure applicable to an embodiment of this application.

Embodiment 1: A WUS detection process shown in FIG. 9 is used as an example for description, including the following steps.

Step 901: A network side device sends a second message to a terminal device, where the second message is used to configure a first PUCCH resource used when the terminal device feeds back information.

Optionally, the second message further includes a PUCCH sending time offset, and the PUCCH sending time offset includes: a time interval between a time point at which a WUS is received and a time point at which PUCCH feedback information is sent, or a time interval between a start time of the terminal device in a wake-up mode of a DRX state and a time point at which PUCCH feedback information is sent.

Step 902: The terminal device receives the second message sent by the network side device.

Step 903: The network side device sends the WUS to the terminal device.

Optionally, the WUS further includes the PUCCH sending time offset.

Step 904: The terminal device receives the WUS, and detects a terminal device-specific field in the WUS.

Optionally, the terminal device detects wake-up information for the terminal device in the WUS.

Step 905: If the terminal device detects the terminal device-specific field and the wake-up information for the terminal device in the WUS, the terminal device determines, by using location information of the terminal device-specific field as a first index, a first PUCCH resource corresponding to the first index, and sends a first PUCCH, where the first PUCCH includes a first message used to feed back that the wake-up information for the terminal device is received.

In an example, if the WUS includes a WIF, the terminal device determines identification information of the terminal device, and determines a location of the terminal device-specific field in the WUS based on the identification information and the WIF.

In another example, if the WUS does not include a WIF, the terminal device determines identification information of the terminal device, and determines a location of the terminal device-specific field in the WUS based on the identification information.

Step 906: The network side device receives the first PUCCH, and determines, based on the first message included in the first PUCCH, that the terminal device receives the wake-up information.

Figure 10:
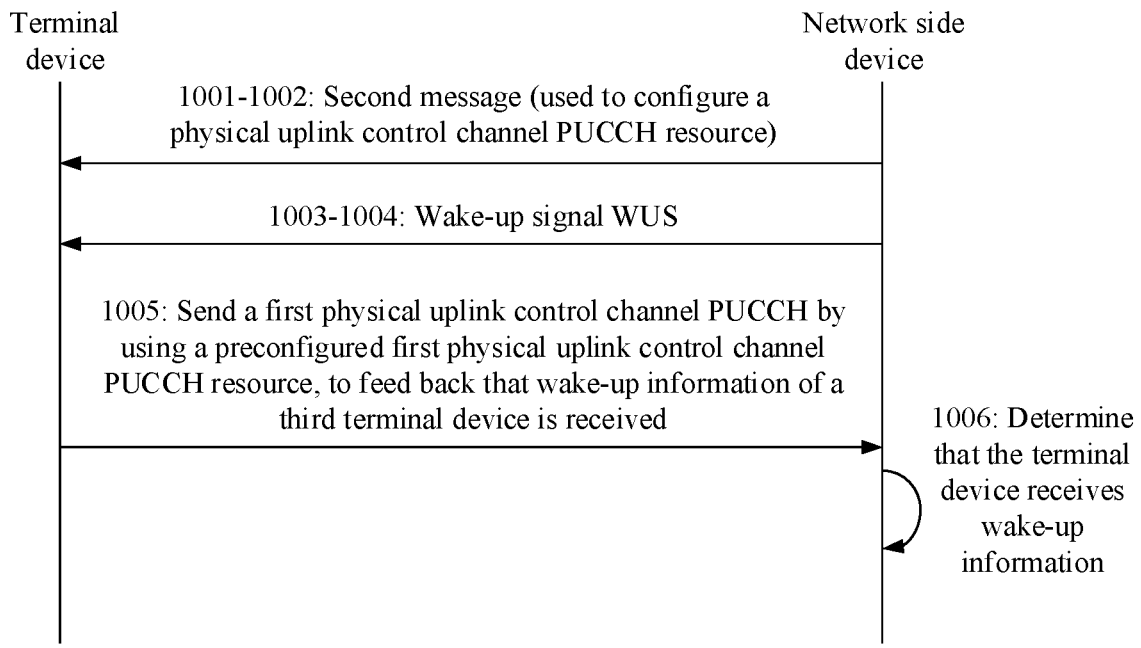
FIG. 10 is a schematic diagram of a WUS detection procedure applicable to an embodiment of this application.

Embodiment 2: A WUS detection process shown in FIG. 10 is used as an example for description, including the following steps.

Step 1001: A network side device sends a second message to a terminal device, where the second message is used to configure a first PUCCH resource used when the terminal device feeds back information.

Optionally, the second message further includes a PUCCH sending time offset, and the PUCCH sending time offset includes: a time interval between a time point at which a WUS is received and a time point at which PUCCH feedback information is sent, or a time interval between a start time of the terminal device in a wake-up mode of a DRX state and a time point at which PUCCH feedback information is sent.

Step 1002: The terminal device receives the second message sent by the network side device.

Step 1003: The network side device sends the WUS to the terminal device.

Optionally, the WUS further includes the PUCCH sending time offset.

Optionally, the WUS is a UE-specific PDCCH WUS, or the WUS is a group-based WUS.

Step 1004: The terminal device receives the WUS, and detects a terminal device-specific field in the WUS.

Optionally, the terminal device detects wake-up information for the terminal device in the WUS.

In an implementation, the terminal device detects the UE-specific PDCCH WUS, and if the UE-specific PDCCH WUS is detected, the terminal device determines that the WUS is received.

In another implementation, if the terminal device does not detect the UE-specific PDCCH WUS, the terminal device attempts to detect the group-based WUS, and if the group-based WUS is detected, the terminal device determines that the WUS is received. If the group-based WUS is not detected, the terminal device sends a second PUCCH by using a preconfigured second PUCCH resource, where the second PUCCH includes a third message used to feed back that the group-based WUS is not received.

Step 1005: If the terminal device detects the terminal device-specific field and the wake-up information for the terminal device in the WUS, the terminal device sends a first PUCCH by using a preconfigured first PUCCH resource, where the first PUCCH includes a first message used to feed back that the wake-up information for the terminal device is received.

In an example, if the WUS includes a WIF, the terminal device determines identification information of the terminal device, determines a location of the terminal device-specific field in the WUS based on the identification information and the WIF, and determines the first PUCCH resource corresponding to location information of the terminal device-specific field.

In another example, if the WUS does not include a WIF, the terminal device determines identification information of the terminal device, determines a location of the terminal device-specific field in the WUS based on the identification information, and determines the first PUCCH resource corresponding to location information of the terminal device-specific field.

Step 1006: The network side device receives the first PUCCH, and determines, based on the first message included in the first PUCCH, that the terminal device receives the wake-up information.

Optionally, if the network side device receives the second PUCCH sent by using the second PUCCH resource, the network side device determines, based on the third message in the second PUCCH, that the terminal device does not receive the wake-up information.

Figure 11:
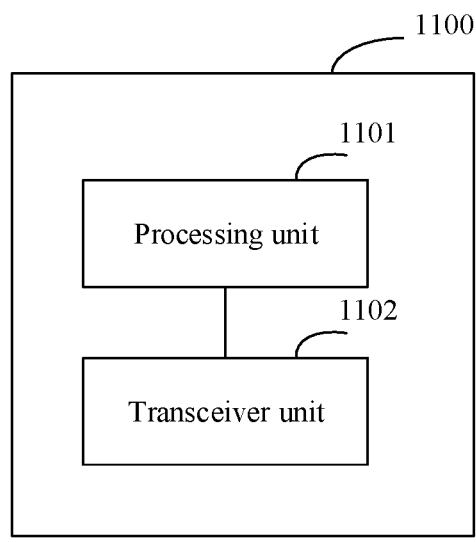
FIG. 11 is a schematic diagram of a structure of a WUS detection apparatus applicable to an embodiment of this application.

The WUS detection method in the embodiments of this application is described in detail above with reference to FIG. 4 to FIG. 10. Based on a same inventive concept as that of the WUS detection method, an embodiment of this application further provides a WUS detection apparatus. As shown in FIG. 11, a WUS detection apparatus 1100 includes a processing unit 1101 and a transceiver unit 1102. The apparatus 1100 may be configured to implement the method described in the foregoing method embodiments that are applied to the terminal device or the network side device.

In an embodiment, the apparatus 1100 is applied to the terminal device.

Specifically, the processing unit 1101 is configured to detect a terminal device-specific field in a detected WUS. If the processing unit 1101 detects the terminal device-specific field in the WUS, and detects that the WUS includes wake-up information for the terminal device, the processing unit 1101 determines, by using location information of the terminal device-specific field as a first index, a first PUCCH resource corresponding to the first index. The transceiver unit 1102 is configured to send a first PUCCH by using the first PUCCH resource, where the first PUCCH includes a first message used to feed back that the wake-up information for the terminal device is received.

In an implementation, the transceiver unit 1102 is further configured to receive a second message sent by the network side device, where the second message is used to configure the first PUCCH resource used when the terminal device feeds back information.

In an implementation, the processing unit 1101 is specifically configured to: if the WUS includes a WIF, determine identification information of the terminal device, and determine a location of the terminal device-specific field in the WUS based on the identification information and the WIF.

In an implementation, the processing unit 1101 is specifically configured to: if the WUS does not include a WIF, determine identification information of the terminal device, and determine a location of the terminal device-specific field in the WUS based on the identification information.

In an implementation, the WUS or the second message further includes a PUCCH sending time offset, and the PUCCH sending time offset includes: a time interval between a time point at which the WUS is received and a time point at which PUCCH feedback information is sent, or a time interval between a start time of the terminal device in a wake-up mode of a discontinuous reception DRX state and a time point at which PUCCH feedback information is sent.

In another embodiment, the apparatus is applied to the terminal device.

Specifically, the processing unit 1101 is configured to: if a WUS is detected, detect a terminal device-specific field in the WUS. If the processing unit 1101 detects the terminal device-specific field in the WUS, and detects that the WUS includes wake-up information for the terminal device, the processing unit 1101 determines a preconfigured first PUCCH resource. The transceiver unit 1102 is configured to send a first PUCCH by using the first PUCCH resource, where the first PUCCH includes a first message used to feed back that the wake-up information for the terminal device is received.

In an implementation, the WUS is a UE-specific PDCCH WUS.

In an implementation, the WUS is a group-based WUS, and the processing unit 1101 is further configured to: if the processing unit 1101 does not detect the UE-specific PDCCH WUS, the processing unit 1101 attempts to detect the group-based WUS.

In an implementation, the transceiver unit 1102 is further configured to: if the processing unit 1101 does not detect the group-based WUS, send a second PUCCH by using a preconfigured second PUCCH resource, where the second PUCCH includes a third message used to feed back that the group-based WUS is not received.

In an implementation, the transceiver unit 1102 is further configured to receive a second message sent by the network side device, where the second message is used to configure the first PUCCH resource used when the terminal device feeds back information.

In an implementation, the processing unit 1101 is specifically configured to: if the WUS includes a WIF, determine identification information of the terminal device, determine a location of the terminal device-specific field in the WUS based on the identification information and the WIF, and determine the first PUCCH resource corresponding to location information of the terminal device-specific field.

In an implementation, the processing unit 1101 is specifically configured to: if the WUS does not include a WIF, determine identification information of the terminal device, determine a location of the terminal device-specific field in the WUS based on the identification information, and determine the first PUCCH resource corresponding to location information of the terminal device-specific field.

In an implementation, the WUS or the second message further includes a PUCCH sending time offset, and the PUCCH sending time offset includes: a time interval between a time point at which the WUS is received and a time point at which PUCCH feedback information is sent, or a time interval between a start time of the terminal device in a wake-up mode of a discontinuous reception DRX state and a time point at which PUCCH feedback information is sent.

In still another embodiment, the apparatus is applied to the network side device.

Specifically, the transceiver unit 1102 is configured to: send a WUS to the terminal device, where the WUS includes a terminal device-specific field; and receive a first PUCCH sent by the terminal device by using a preconfigured first PUCCH resource.

The processing unit 1101 is configured to determine, based on the first message that is used to feed back that wake-up information for the terminal device is received and that is included in the first PUCCH, that the terminal device receives the wake-up information.

In an implementation, the transceiver unit 1102 is further configured to send a second message to the terminal device, where the second message is used to configure the first PUCCH resource used when the terminal device feeds back information.

In an implementation, the WUS or the second message further includes a PUCCH sending time offset, and the PUCCH sending time offset includes: a time interval between a time point at which the WUS is received and a time point at which PUCCH feedback information is sent, or a time interval between a start time of the terminal device in a wake-up mode of a discontinuous reception DRX state and a time point at which PUCCH feedback information is sent.

In an implementation, the transceiver unit 1102 is further configured to receive a second PUCCH sent by the terminal device by using a second PUCCH resource. The processing unit 1101 is further configured to determine, based on a third message that is used to feed back that a group-based WUS is not received and that is included in the second PUCCH, that the terminal device does not receive the wake-up information.

It should be noted that in the embodiments of this application, division into the modules is an example, and is merely logical function division. During actual implementation, there may be another division manner. In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 12:
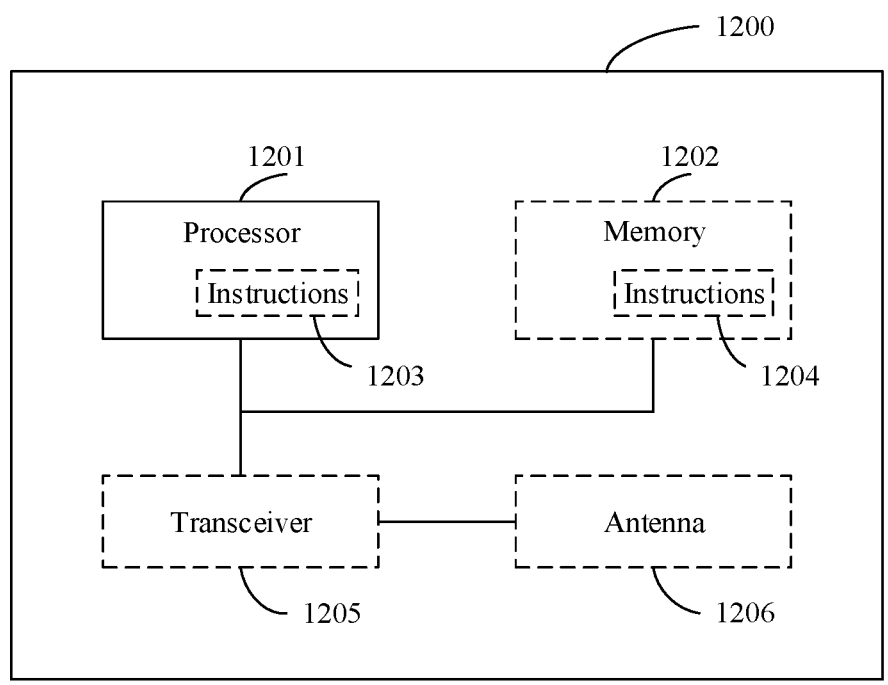
FIG. 12 is a schematic diagram of a structure of a WUS detection apparatus applicable to an embodiment of this application.

Based on a same concept as that of the WUS detection method. As shown in FIG. 12, an embodiment of this application further provides a schematic diagram of a structure of a WUS detection apparatus 1200. The apparatus 1200 may be configured to implement the method described in the foregoing method embodiments that are applied to the terminal device or the network side device. For details, refer to the descriptions in the foregoing method embodiments.

The apparatus 1200 includes one or more processors 1201. The processor 1201 may be a general-purpose processor, a dedicated processor, or the like. For example, the processor 1201 may be a baseband processor or a central processing unit. The baseband processor may be configured to process a communications protocol and communications data. The central processing unit may be configured to: control a communications apparatus (for example, a base station, a terminal, or a chip), execute a software program, and process data of the software program. The communications apparatus may include a transceiver unit that is configured to implement input (receiving) and output (sending) of a signal. For example, the transceiver unit may be a transceiver, a radio frequency chip, or the like.

The apparatus 1200 includes one or more processors 1201, and the one or more processors 1201 may implement the method of the terminal device or the network side device in the foregoing embodiments.

Optionally, in addition to implementing the method in the foregoing embodiments, the processor 1201 may further implement another function. In a design, the processor 1201 may execute instructions, so that the apparatus 1200 performs the method described in the foregoing method embodiments. All or some of the instructions, for example, instructions 1203, may be stored in the processor. Alternatively, all or some of the instructions, for example, instructions 1204, may be stored in a memory 1202 coupled to the processor. Alternatively, the apparatus 1200 may be enabled, by using both instruction 1203 and instruction 1204, to perform the method described in the foregoing method embodiments.

In still another possible design, the communications apparatus 1200 may alternatively include a circuit, and the circuit may implement a function of the terminal device or the network side device in the foregoing method embodiments.

In still another possible design, the apparatus 1200 may include one or more memories 1202 that store the instruction 1204. The instruction may be run on the processor, so that the apparatus 1200 performs the method described in the foregoing method embodiments. Optionally, the memory may further store data. Optionally, the processor may also store instructions and/or data. For example, the one or more memories 1202 may store the correspondence described in the foregoing embodiments, the related parameter, the table, or the like in the foregoing embodiments. The processor and the memory may be separately disposed, or may be integrated together.

In still another possible design, the apparatus 1200 may further include a transceiver 1205 and an antenna 1206. The processor 1201 may be referred to as a processing unit, to control an apparatus (a terminal or a base station). The transceiver 1205 may be referred to as a transceiver, a transceiver circuit, a transceiver unit, or the like, and is configured to implement a transceiver function of the apparatus by using the antenna 1206.

It should be noted that the processor in the embodiments of this application may be an integrated circuit chip, and has a signal processing capability. In an implementation process, the steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (Synchlink DRAM, SLDRAM), and a direct rambus random access memory (DR RAM). It should be noted that the memory of the systems and methods described in this specification includes but is not limited to these and any memory of another proper type.

An embodiment of this application further provides a computer-readable medium that stores a computer program. When the computer program is executed by a computer, the WUS detection method described in any one of the method embodiments that are applied to the terminal device or the network side device is implemented.

An embodiment of this application further provides a computer program product. When the computer program product is executed by a computer, the WUS detection method described in any one of the method embodiments that are applied to the terminal device or the network side device is implemented.

An embodiment of this application further provides a communications system. The communications system includes a terminal device configured to implement any one of the foregoing method embodiments and a network side device configured to implement any one of the foregoing method embodiments.

All or some of the foregoing embodiments may be implemented by using software, hardware, firmware, or any combination thereof. When the embodiments are implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

An embodiment of this application further provides a processing apparatus, including a processor and an interface. The processor is configured to perform the WUS detection method described in any one of the method embodiments that are applied to the terminal device or the network side device.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has usually described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that, the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. Indirect couplings or communications connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by using hardware, firmware, or a combination thereof. When this application is implemented by using software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another place. The storage medium may be any usable medium accessible by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and can be accessed by the computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio, and microwave are included in the definition of the medium to which they belong. A disk and a disc used in this application include a compact disc (CD), a laser disc, an optical disc, a digital versatile disk (DVD), a floppy disk, and a Blu-ray disc. The disk usually copies data in a magnetic manner, but the disc copies data optically through a laser. The foregoing combination should also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application should fall in the protection scope of this application.

What is claimed is:

1. A wake-up signal (WUS) detection method comprising:
   detecting, by a terminal device, a terminal device-specific field in a detected WUS;
   based on detecting the WUS comprises wake-up information for the terminal device,
      determining, by the terminal device using location information of the terminal device-specific field as a first index, a first physical uplink control channel (PUCCH) resource associated with the first index;
      sending, by the terminal device, the first PUCCH to a network side device,
   wherein the first PUCCH comprises a first message used to feed back that the wake-up information for the terminal device is received;
   determining whether the WUS comprises a wake-up indicator field (WIF); and
   based on the WUS not including the WIF, determining, by the terminal device, a location of the terminal device-specific field, wherein the determination comprises:
      determining identification information of the terminal device, and
      determining the location of the terminal device-specific field in the WUS based on the identification information.

2. The method according to claim 1, wherein before detecting the terminal device-specific field in the detected WUS, the method further comprises:
   receiving, by the terminal device, a second message from the network side device, wherein the second message is used to configure the first PUCCH resource used when for the terminal device feeding back information.

3. The method according to claim 2, wherein the WUS or the second message further comprises a PUCCH sending time offset comprising
   a time interval between a time point at which the WUS is received and a time point at which PUCCH feedback information is sent.

4. The method according to claim 2, wherein the WUS or the second message further comprises a PUCCH sending time offset comprising a time interval between a start time of the terminal device in a discontinuous reception (DRX) on duration and a time point at which PUCCH feedback information is sent.

5. The method according to claim 1, wherein based on the WUS comprising the WIF, determining the location of the terminal device-specific field comprises:
   determining, by the terminal device, the identification information of the terminal device; and
   determining the location of the terminal device-specific field in the WUS based on the identification information and the WIF.

6. A wake-up signal (WUS) detection method comprising:
   sending, by a network side device, a WUS to a terminal device, wherein the WUS comprises a terminal device-specific field;
   receiving, by the network side device, a first physical uplink control channel (PUCCH) from the terminal device by using a preconfigured first PUCCH resource or a second PUCCH from the terminal device by using a second PUCCH resource;
   determining, by the network side device, that the terminal device receives wake-up information for the terminal device based on a first message included in the first PUCCH and used to feed back information that the wake-up information is received; and
   determining, by the network side device, the terminal device does not receive the wake-up information based on a third message included in the second PUCCH and used to feed back information that a group-based WUS is not received.

7. The method according to claim 6, further comprising:
   sending, by the network side device, a second message to the terminal device, wherein the second message is used to configure the first PUCCH resource used for the terminal device feeding back information.

8. The method according to claim 7, wherein the WUS or the second message further comprises a PUCCH sending time offset, and the PUCCH sending time offset comprises a time interval between a time point at which the WUS is received and a time point at which PUCCH feedback information is sent.

9. The method according to claim 7, wherein the WUS or the second message further comprises a PUCCH sending time offset comprising a time interval between a start time of the terminal device in discontinuous reception (DRX) on duration and a time point at which PUCCH feedback information is sent.

10. A wake-up signal (WUS) detection apparatus comprising:
    at least one processor; and
    a memory storing programming instructions for execution by the at least one processor, the programming instructions instructing the WUS detection apparatus to perform operations comprising:

detecting an apparatus-specific field in a detected WUS;
based on detecting the WUS comprising wake-up information for the apparatus,
  determining, by using location information of the an apparatus-specific field as a first index, a first physical uplink control channel (PUCCH) resource corresponding to the first index;
  sending a first PUCCH to a network side device, wherein the first PUCCH comprises a first message used to feed back that the wake-up information for the apparatus is received;
determining, by the apparatus, whether the WUS comprises a wake-up indicator field (WIF); and
based on detecting the WUS is not included in the WIF, determining, by the apparatus, a location of the apparatus device-specific field, wherein the determination comprises:
  determining identification information of the apparatus; and
  determining the location of the apparatus-specific field in the WUS based on the identification information.

11. The apparatus according to claim 10, wherein the operations further comprises receiving a second message from the network side device, wherein the second message is used to configure the first PUCCH resource used for the apparatus feeding back information.

12. The apparatus according to claim 11, wherein the WUS or the second message further comprises a PUCCH sending time offset comprising a time interval between a time point at which the WUS is received and a time point at which PUCCH feedback information is sent.

13. The apparatus according to claim 11, wherein the WUS or the second message further comprises a PUCCH sending time offset comprising a time interval between a start time of the apparatus in a discontinuous reception (DRX) on duration and a time point at which PUCCH feedback information is sent.

14. The apparatus according to claim 10, wherein based on the WUS comprising the WIF, determining the location of the terminal device-specific field comprises:
  determining the identification information of the apparatus; and
  determining the location of the terminal device-specific field in the WUS based on the identification information and the WIF.

15. A wake-up signal (WUS) detection apparatus comprising:
  at least one processor; and
  a memory storing programming instructions for execution by the at least one processor, the programming instructions instructing the WUS detection apparatus to perform operations comprising:
    sending a WUS to a terminal device, wherein the WUS comprises a terminal device-specific field;
    receiving a first physical uplink control channel (PUCCH) from the terminal device by using a pre-configured first PUCCH resource or a second PUCCH from the terminal device by using a second PUCCH resource;
    determining the terminal device receives wake-up information for the terminal device based on a first message included in the first PUCCH and used to feed back information that the wake-up information is received; and
    determining the terminal device does not receive the wake-up information for the terminal based on a third message included in the second PUCCH and used to feed back information that a group-based WUS is not received.

16. The apparatus according to claim 15, wherein the operations further comprise sending a second message to the terminal device, wherein the second message is used to configure the first PUCCH resource used for the terminal device feeds back information.

17. The apparatus according to claim 16, wherein the WUS or the second message further comprises a PUCCH sending time offset comprising a time interval between a time point at which the WUS is received and a time point at which PUCCH feedback information is sent.

18. The apparatus according to claim 16, wherein the WUS or the second message further comprises a PUCCH sending time offset comprising a time interval between a start time of the terminal device in discontinuous reception (DRX) on duration and a time point at which PUCCH feedback information is sent.

* * * * *